(12) United States Patent
Jang et al.

(10) Patent No.: US 6,314,222 B1
(45) Date of Patent: Nov. 6, 2001

(54) LONG-PERIOD OPTICAL FIBER GRATING FILTER DEVICE

(75) Inventors: Joo-Nyung Jang; Sun-Wook Kim, both of Seoul; Se-Yoon Kim, Anyang-shi; Min-Sung Kim, Songnam-shi, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/467,688

(22) Filed: Dec. 21, 1999

(51) Int. Cl.[7] ............................................. G02B 6/34
(52) U.S. Cl. ........................ 385/37; 385/128; 385/141; 359/130
(58) Field of Search ................................ 385/37, 24, 128, 385/31, 141; 359/130, 178

(56) References Cited

U.S. PATENT DOCUMENTS

| 6,011,886 | * | 1/2000 | Abramov | 385/37 |
| 6,198,868 | * | 3/2001 | Jang | 385/128 |
| 6,233,386 | * | 5/2001 | Pack et al. | 385/37 |

FOREIGN PATENT DOCUMENTS

| 0800098-A2 | * | 4/1997 | (EP) | 385/37 |

OTHER PUBLICATIONS

"Displacements of the resonant peaks of a long–period fiber grating induced by a change of ambient refractive index", 1997 Optics Letters, Dec. 1, 1997/vol. 22, No. 23.*

* cited by examiner

Primary Examiner—Darren Schuberg
Assistant Examiner—Fayez Assaf
(74) Attorney, Agent, or Firm—Steve Cha; Klauber & Jackson

(57) ABSTRACT

A long-period fiber grating filter device which includes a core having refractive index modulations formed therein at every predetermined distance, a cladding surrounding the core, a coating covering the cladding portion not adjacent to the long-period fiber gratings, a recoating covering the cladding portion adjacent to the long-period fiber gratings, a long-period fiber grating where a coupling wavelength exhibits a negative wavelength shift with respect to temperature change according to the amount of a dopant added to the core, and a recoating material where the refractive index decreases with temperature increase and the coupling wavelength exhibits a positive wavelength shift by the effect of the recoating material, wherein the negative wavelength shift in long-period fiber grating itself and the positive wavelength shift by the effect of the recoating material balance each other to eliminate temperature control in the long-period grating filter device.

5 Claims, 14 Drawing Sheets

LONG-PERIOD OPTICAL FIBER GRATING FILTER DEVICE

CLAIM OF PRIORITY

This application makes reference to, incorporates the same herein, and claims all benefits accruing under 35 U.S.C. Section 119 from an application for LONG-PERIOD FIBER GRATING FILTER filed in the Korean Industrial Property Office on Sep. 9, 1999 and there duly assigned Serial No. 99-38267.

BACKGROUND OF THE INVENTION

1. Field of the Invention

The present invention relates generally to a long-period fiber grating filter device, and in particular, to a temperature compensating long-period fiber grating filter device which permits the use of long-period grating device without temperature control.

2. Description of the Related Art

An optical fiber grating is generally used as a filter for selecting an optical signal at a specific wavelength from multiple wavelengths propagating along a core. The optical fiber grating can eliminate or reflect light at a specific wavelength by inducing a periodic change in the refractive index of an optical fiber using an ultraviolet (UV) laser. The optical fiber grating is categorized into short period gratings and long-period gratings.

The short period gratings reflect light at a specific wavelength in the filtering process, whereas the long-period fiber gratings or transmission gratings remove light without reflection by converting the optical signal propagating in the same direction along the core mode into the cladding mode. The long-period fiber gratings includes a plurality of reflective index perturbations spaced along the fiber by a predetermined distance that ranges from several tens of $\mu$m to several hundreds of $\mu$m, and capable of flattening the spectral gain dependence of an EDFA (Erbium Doped Fiber Amplifier) due to its ability to remove light at the intended wavelength by coupling light from a guided mode to a non-guided mode.

The long-period fiber gratings are fabricated by varying the refractive index in a core of an optical fiber to be sensitive to UV radiation for every predetermined distance. The refractive index is increased in the core portion exposed to the UV radiation but not changed in the core portion not exposed to the UV radiation, causing a periodic change in the refractive index along the longitudinal axis of the optical fiber.

However, the long-period fiber gratings (LPGs) exhibit temperature sensitivity, and the optical characteristics are influenced by the ambient refractive index of the cladding. The long-period gratings show a high temperature sensitivity, typically in the order of 5–15 nm/100° C. In order to use as a gain flattening filter, an exact and a stable shaping of the LPGs spectrum to temperature variation is essential because a small shift of the filter spectrum produces large fluctuations in the flattened gain spectrum.

As a solution for compensating the temperature sensitivity of the LPGs, we propose a novel mechanism which uses a general polymer as a recoating material.

A mathematical expression is available for describing the characteristic of an optical fiber, for example, coupling of a given wavelength occurs in a long-period fiber grating filter device when the phase matching condition of Eq. 1 is satisfied.

$$\beta_{co} - \beta_{cl}^{(m)} = \frac{2\pi}{\Lambda} \tag{1}$$

wherein $\beta_{co}$ represents the propagation constant in a core mode, $\beta_{cl}^{(m)}$ represents the propagation constant in an $m^{th}$ order of cladding mode, and $\Lambda$ represents the grating period.

If $$\beta = 2\pi \frac{n}{\lambda}$$

(n represents a refractive index and $\lambda$ represents a wavelength), the following equation follows:

$$(n_{co} - n_{cl}^{(m)}) = \lambda/\Lambda \tag{2}$$

As shown in equation (2), the wavelength of light at which it can be converted to a cladding mode can be determined by the grating period $\Lambda$ and the refractive index difference $(n_{co} - n_{cl}^{(m)})$.

The refractive index difference is obtained by appropriately irradiating a UV-sensitive optical fiber with the UV light. The UV light is projected onto the amplitude masks with a specific grating period $\Lambda$. Then, the optical fiber reacts to the UV radiation in such a way that the refractive index of a core changes and creates fiber grating. In order to obtain the intended spectrum (i.e., intended coupling wavelength and extinction ratio) from the long-period fiber grating filter device, the UV light should be projected for an appropriate time while accurately controlling the masking period.

Furthermore, the coupling wavelength of the above optical fiber gratings is temperature sensitive. Accordingly, a shift in the coupling wavelength with respect to temperature change is determined by the variations in the refractive index and lengthwise thermal expansion with temperature change. This can be expressed as follow:

$$\frac{d\lambda^{(m)}}{dT} = \frac{d\lambda^{(m)}}{dn}\frac{dn}{dT} + \frac{d\lambda^{(m)}}{d\Lambda}\frac{d\Lambda}{dT} \tag{3}$$

wherein T represents temperature.

When a long-period fiber grating filter device is fabricated of a general communication optical fiber or dispersion shifted optical fiber, $$\frac{d\lambda^{(m)}}{dn}\frac{dn}{dT}$$

is larger than $$\frac{d\lambda^{(m)}}{d\Lambda}\frac{d\Lambda}{dT}$$

by several tens of times, and thus $$\frac{d\lambda^{(m)}}{d\Lambda}\frac{d\Lambda}{dT}$$

is neglected. For example, the coupling wavelength of Flexcor 1060 of Corning shifts by 5 nm per 100° C. In a typical dispersion shifted optical fiber, the coupling wavelength shifts by 0.3 nm per 100° C. with respect to lengthwise expansion, and 5 nm per 100° C. with respect to the refractive index change. For a real application, a temperature stability of about 0.3 nm per 100° C. is required for flattening the spectral gain in a long-period optical fiber grating filter.

In prior art, in order to compensate the temperature change, the refractive index distribution in an optical fiber is designed or the grating period of the optical fiber is selected so that $$\frac{d\lambda^{(m)}}{d\Lambda}$$

in Eq. 3 has a negative value. Alternatively, $B_2O_3$ is added to the optical fiber to obtain the value of $$\frac{dn}{dT}$$

to be zero.

If $\Lambda<100$ $\mu$m in the general long-period grating filter, $$\frac{d\lambda^{(m)}}{d\Lambda}$$

becomes a negative value according to the conventional method of controlling the refractive index of the filter, which sets $$\frac{d\lambda^{(m)}}{d\Lambda}$$

to a negative value. When $\Lambda=40$ $\mu$m, the dependence of wavelength on temperature in the Flexcor 1060 fiber is 0.15–0.45 nm/100° C., but the $\lambda^{(m)}$ mode is in the 1.1 $\mu$m region and deviates from the communication region.

A temperature compensating long-period fiber grating filter device is disclosed in detail in Korea Application No. 99-8332 entitled, "Temperature Compensating Long-period Fiber Grating Filter," filed by the present applicant.

While the recoating of the long-period fiber grating filter in above Korean co-pending application is formed of a material that would increase the refractive index with temperature increase, the refractive index of a general recoating material, such as a polymer, decreases with temperature increase due to its thermal expansion. Thus, when a general long-period fiber grating filter which shows the positive $d\Lambda/dt$ is recoated with a general polymer material which shows negative dn/dt, the long wavelength shift effect by the recoating material adds to the long wavelength shift characteristic of the long-period fiber grating filter. In this case, the temperature sensitivity of long-period fiber grating filter can be suppressed with a polymer recoating which shows positive dn/dt as we mentioned in details in the Korean Application number 99-8332. Accordingly, we propose an additional technique for stabilizing the long-period grating device without temperature control.

SUMMARY OF THE INVENTION

It is, therefore, an object of the present invention to provide a temperature compensating long-period grating filter device which permits the use of long-period grating device without temperature control.

It is another object of the present invention to provide a temperature compensating long-period grating filter device that is resistant against the moisture, and soft enough to prevent the micro bending losses.

To achieve the above stated objects, the long-period grating filter device includes a core having refractive index modulation formed therein at every predetermined distance for coupling light of a given wavelength, a cladding surrounding the core, a coating covering the cladding portion not surrounding the long-period fiber gratings, a recoating covering the cladding portion surrounding the long-period fiber gratings, a core which is added with the amount of a dopant in order to exhibit a negative $d\Lambda/dt$, where $\Lambda$ is the coupling wavelength and T is temperature, and the recoating portion where the refractive index of the recoating material decrease with the temperature increases, i.e. negative dn/dt, where n is the refractive index of a recoating material and T is the temperature. Accordingly, long-period grating itself without the recoating exhibits a negative coupling wavelength shift in which the appropriate amount of dopant added to the core. A positive coupling wavelength shift by the effect of the recoating material whose refractive index decreases with temperature, thus canceling the wavelength shifts from each other.

A BRIEF DESCRIPTION OF THE DRAWINGS

These and other and further objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail since they would obscure the invention in unnecessary detail.

Figure 1A:
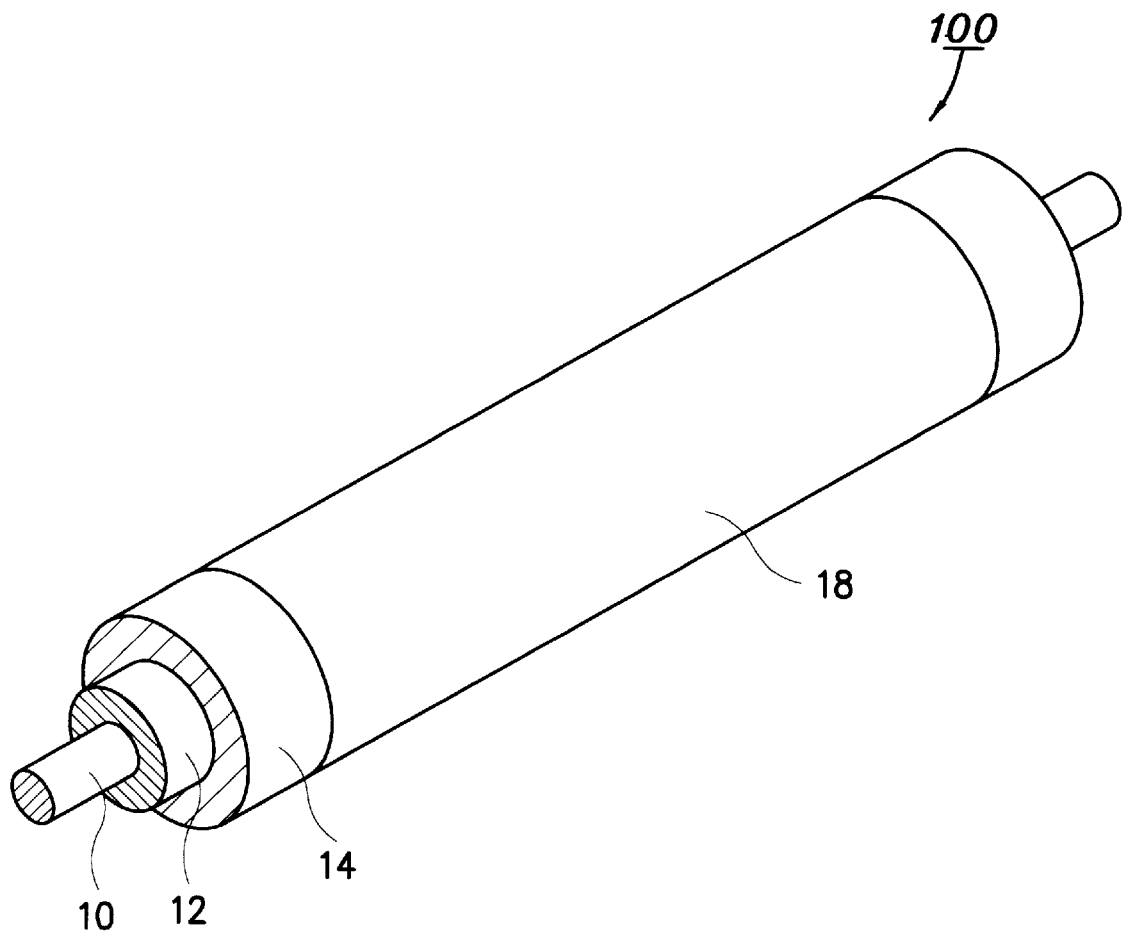
FIG. 1A is a perspective view of a long-period fiber grating filter device.
Figure 1B:
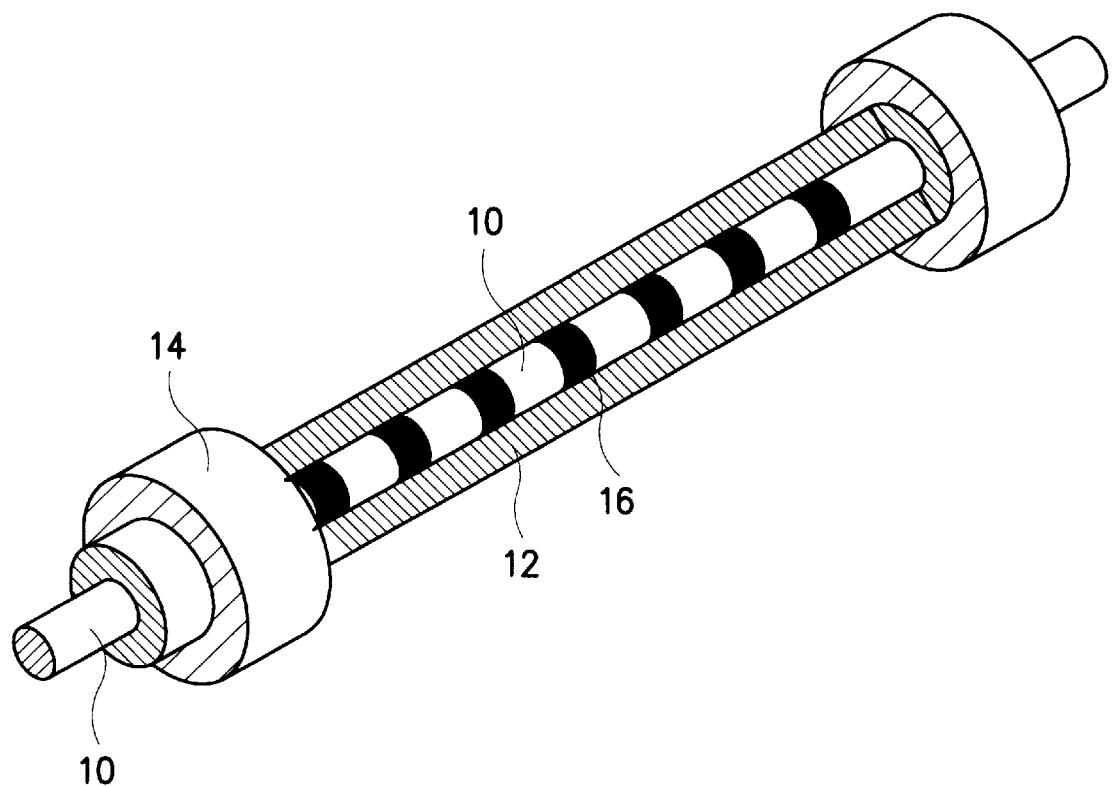
FIG. 1B is a perspective view of a long-period fiber grating filter without the recoating.
Figure 1C:
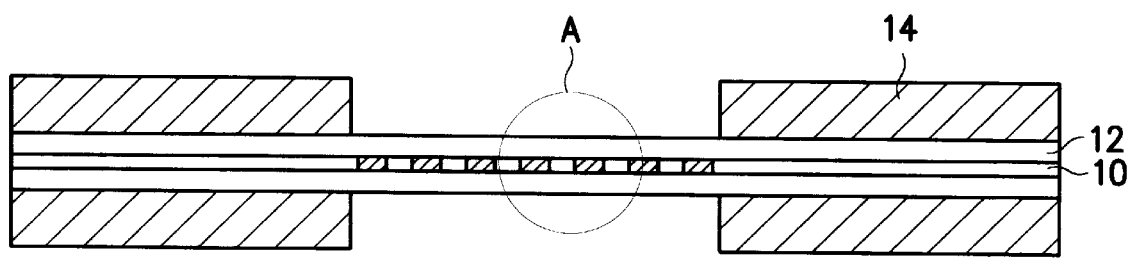
FIG. 1C is a sectional view of the long-period fiber grating filter device without the recoating.
Figure 1D:
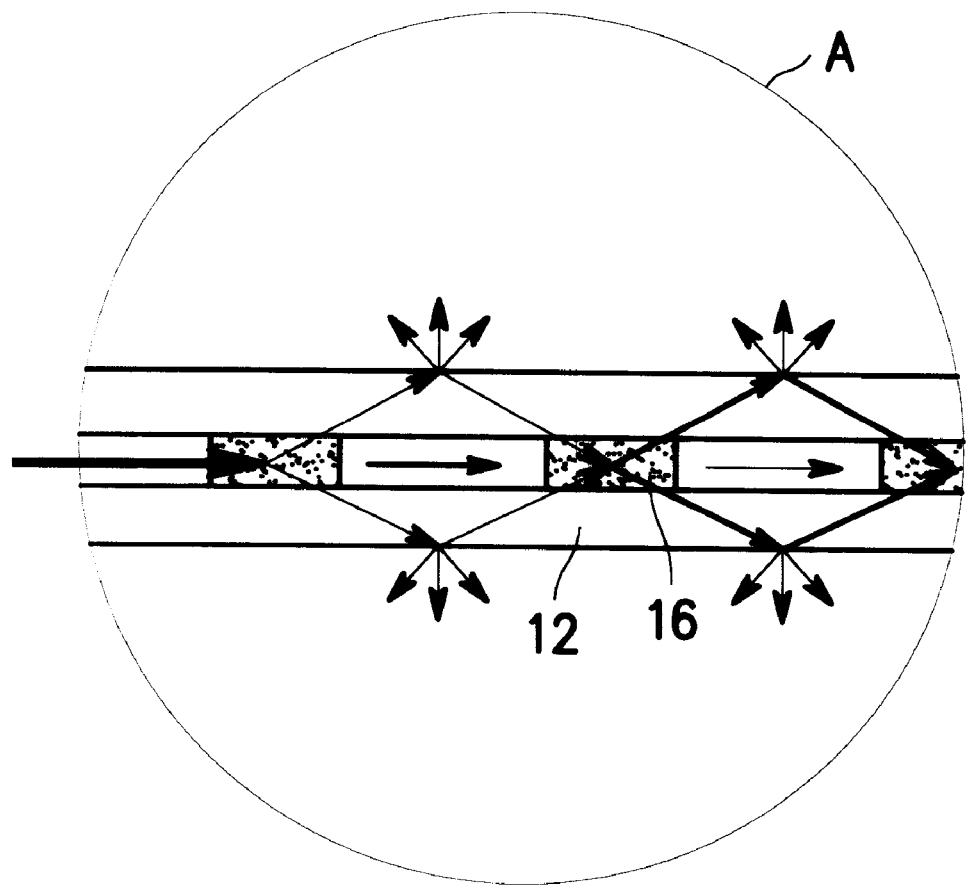

According to the present invention, a plurality of long-period fiber gratings is provided along the length of an optical fiber for a predetermined period to function as a filter for converting light of a given wavelength from a core mode to the cladding modes. That is, the core is provided with a plurality of perturbations in its refractive index that are spaced apart by a predetermined distance for transmission light of wavelength. Specifically, as shown in FIGS. 1A, 1B, and 1C, a packaged long-period fiber grating filter device 100 includes a core 10 having refractive index modulation formed thereon at every predetermined distance, a cladding 12 surrounding the core 10, a coating 14 surrounding the cladding 12, and a recoating 18 coated to surround the cladding and the core having reflective index modulation. The recoating is applied to the portion from which the coating 14 is removed to compensate the temperature sensitivity of long-period fiber gratings.

In FIG. 1C, the arrows indicating a wavelength propagating direction denotes the coupling from a core mode to the cladding modes in the long-period fiber grating filter device. The optical signal at a central wavelength traveling in the fundamental guide mode in the core 10 is scattered when hitting the refractive index modulation. Some scattered beams are carried by the cladding. Cladding modes that satisfy the phase matching condition are coherently intensified and the coupled cladding modes are decayed at the boundary between cladding and air. As a result, the long-period fiber grating filter device 100 acts as a wavelength dependent attenuator.

Accordingly, the intensity of the light traveling in the fundamental guide mode is reduced while passing through the long-period fiber gratings 16, and the intensity of the light of the wavelength coupled to the cladding 12 is increased, as shown in FIG. 1c.

If the external condition of a cladding 12 was air, then the refractive index would be 1. However, if the cladding 12 is recoated with a material with a refractive index of n after the formation of the long-period fiber gratings 16, the coupling condition would be changed, and as a result, the coupling wavelength would be shifted to either the long or the short wavelength depending on the refractive index of the recoating material. This can be examined in FIGS. 2A to 2D, which illustrates graphs showing various shifts of coupling wavelengths with respect to different ambient refractive index of the cladding.

Figure 2A:
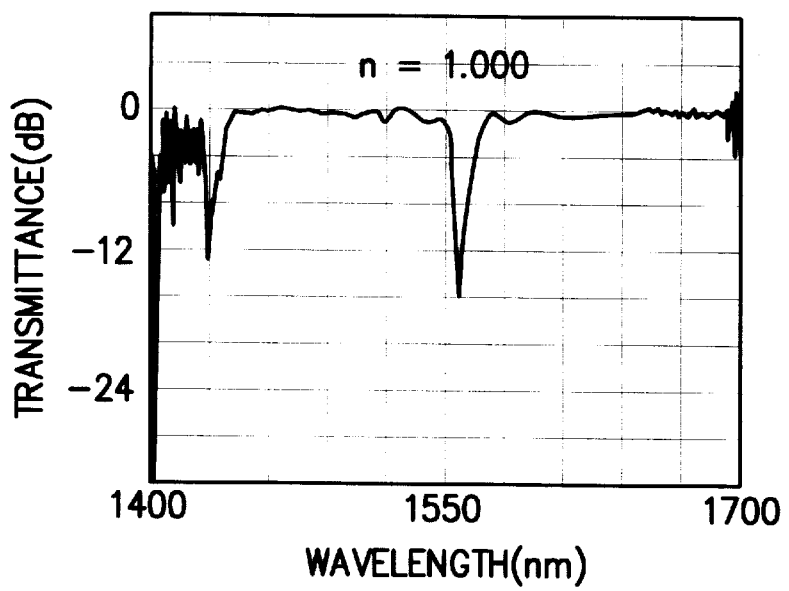
FIGS. 2A to 2D are graphs showing the coupling wavelength shift with respect to the ambient refractive index of a cladding.

FIG. 2A depicts a graph illustrating an optical transmittance characteristic when an ambient refractive index (the refractive index of air) of the cladding surrounding the long-period fiber gratings is 1.

Figure 2B:
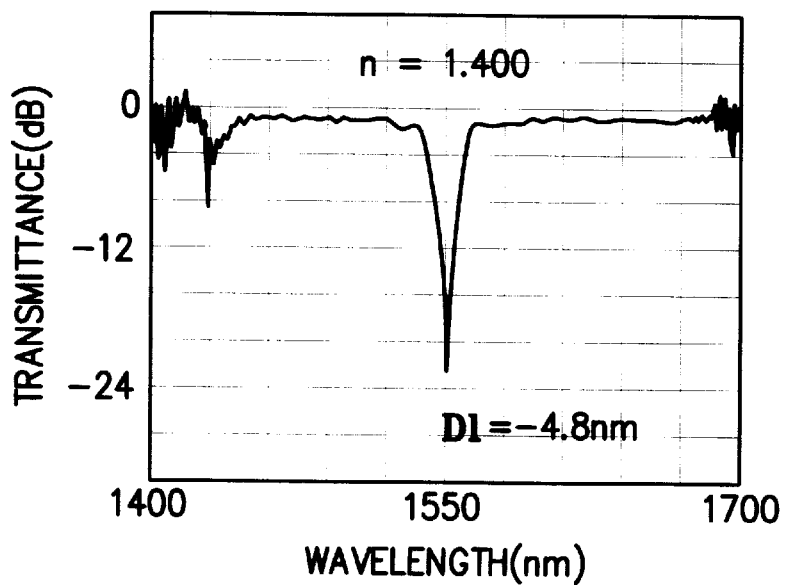

FIG. 2B depicts a graph illustrating an optical transmittance characteristic when the ambient refractive index of the cladding is 1.400. It is noted that the optical transmittance is increased and the coupling wavelength shifts to a short wavelength by about 4.8 nm in comparison to the graph of FIG. 2A.

Figure 2C:
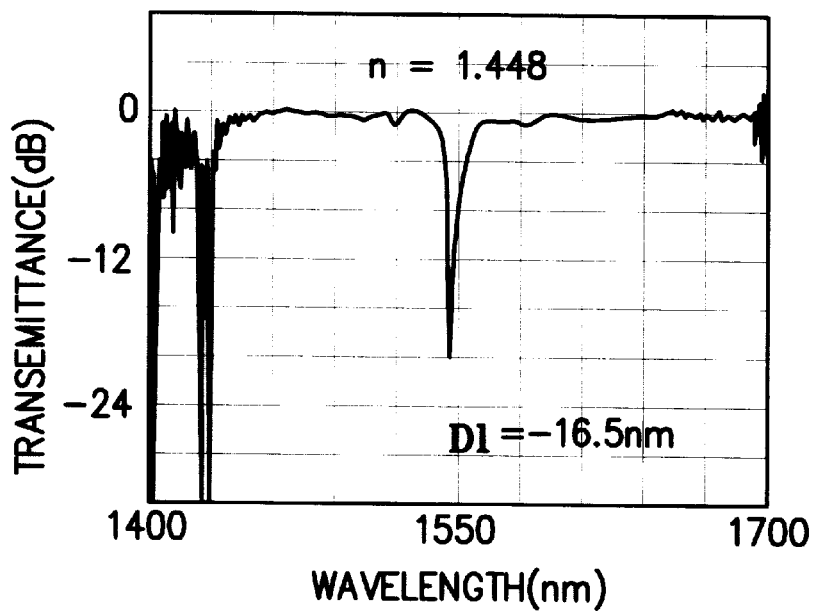

FIG. 2C depicts a graph illustrating an optical transmittance characteristic when the ambient refractive index of the cladding is 1.448. The coupling wavelength shifts to a short wavelength by 16.5 nm in comparison to FIG. 2A.

Figure 2D:
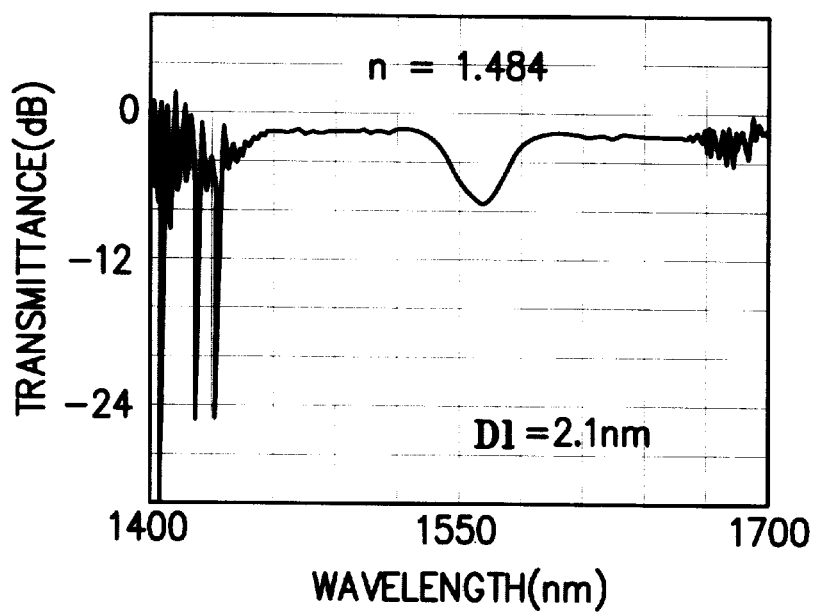

FIG. 2D depicts a graph illustrating an optical transmittance characteristic when the ambient refractive index of the cladding is 1.484. The coupling wavelength shifts to a long wavelength in comparison to FIG. 2A.

If the ambient refractive index of the cladding increases from 1 but less than the refractive index of the cladding, the coupling wavelength shifts to a short wavelength, as shown in FIGS. 2B and 2C. On the other hand, if the ambient refractive index of the cladding exceeds the refractive index of the cladding, the coupling wavelength shifts to a long wavelength, as shown in FIG. 2D. If the ambient refractive index of the cladding is equal to the refractive index of the cladding, an internal reflection condition is released and a coupling peak is disappeared.

Figure 3:
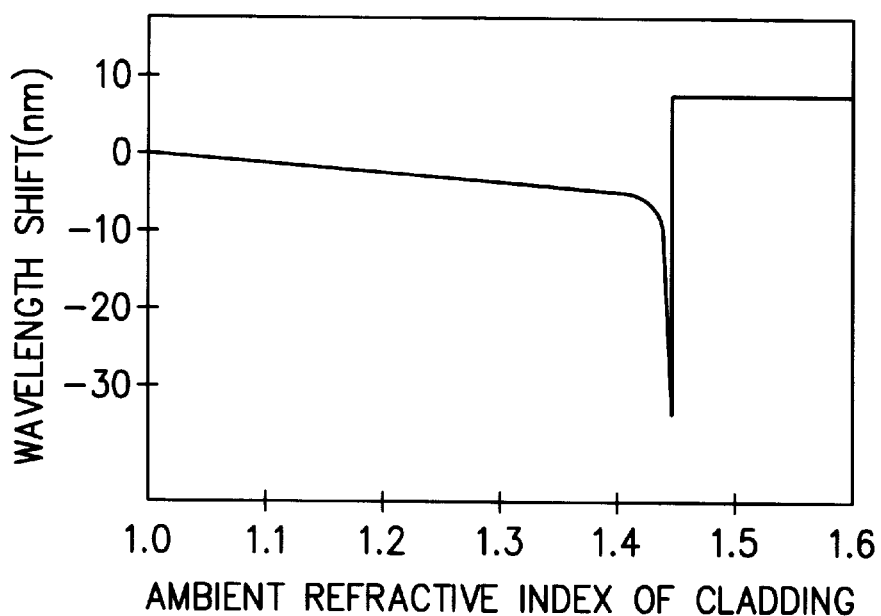
FIG. 3 is a graph showing the coupling wavelength shift with respect to a change in the ambient refractive index of a cladding.

FIG. 3 depicts a graph illustrating a coupling wavelength shift with respect to the change in the ambient refractive index of the cladding. The coupling wavelength shifts to a short wavelength as the ambient refractive index increases from 1.0. The coupling peak disappears when the ambient refractive index is equal to the refractive index of the cladding, and then the coupling wavelength shifts to a long wavelength when the ambient refractive index exceeds the refractive index of the cladding.

Figure 4:
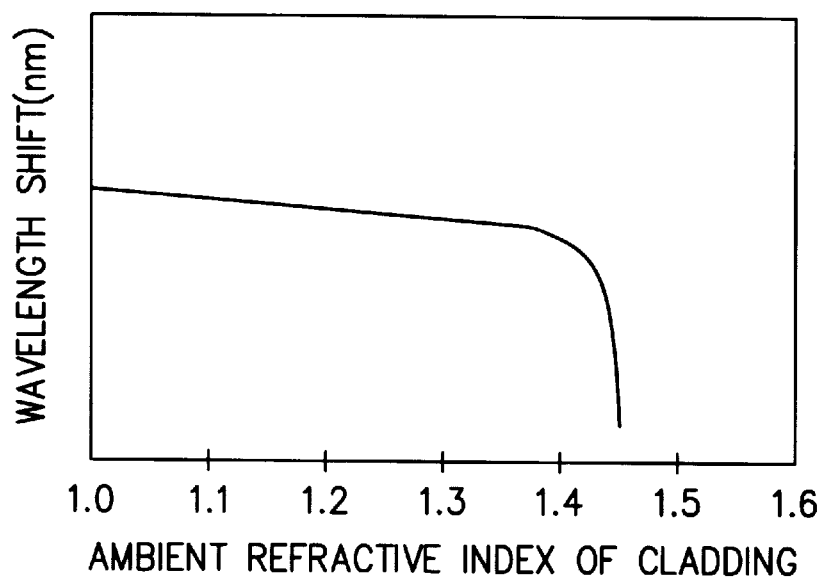
FIG. 4 is a graph showing the coupling wavelength shift with respect to the ambient refractive index of a cladding when it is less than the refractive index of the cladding.

FIG. 4 depicts a graph illustrating a coupling wavelength shift with respect to the change in the ambient refractive index of the cladding when the ambient refractive index is less than the refractive index of the cladding.

The illustrative graphs as shown in FIGS. 2A to 4 are disclosed in detail in a thesis written by the present inventor, "Displacement of the Resonant Peaks of a Long-period Fiber Grating Induced by a Change of Ambient Refractive Index," 1997 Optics Letters, Dec. 1, 1997/Vol. 22, No. 23.

Figure 5A:
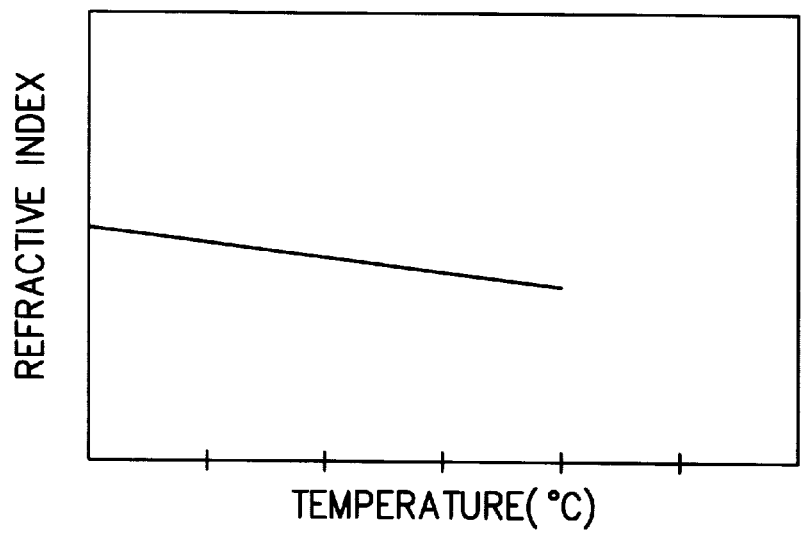
FIG. 5A is a graph showing the refractive index variation with temperature increase when the recoating is made of general polymer material.
Figure 5B:
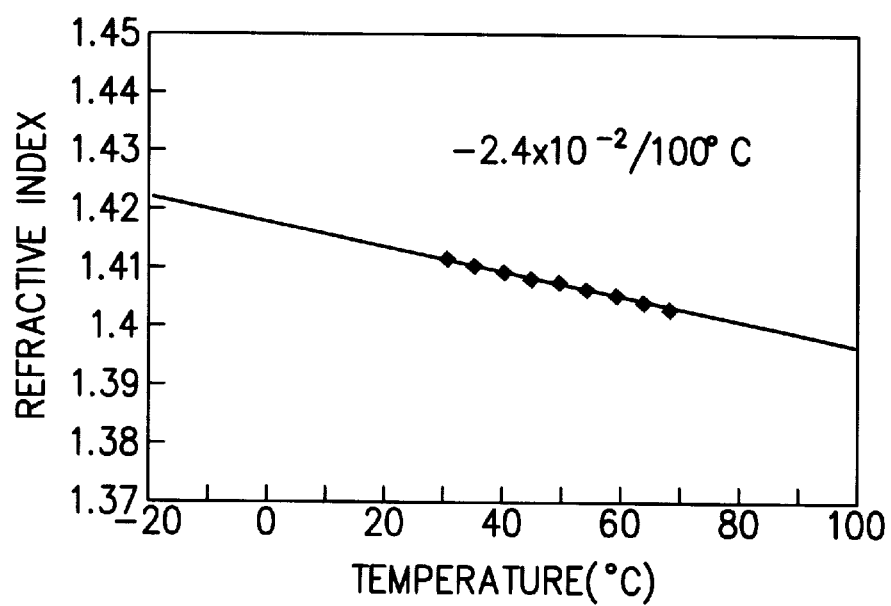
FIG. 5B is a graph showing the refractive index variation with temperature increase when the recoating is made of silicon resin.

FIG. 5A depicts a graph illustrating a change in the refractive index of a general recoating material with temperature increase, and FIG. 5B depicts a change in the refractive index with temperature when silicon resin was used as the general recoating material.

Referring to FIG. 5A, the general recoating material, such as a polymer, experiences thermal expansion with temperature increase and the refractive index decreased with temperature increase. Referring to FIG. 5B, the silicon resin also experiences thermal expansion with temperature increase and the refractive index decreased with temperature increase. The refractive index variation of the silicon resin with temperature is $-2.4 \times 10^{31}$ 2/100° C.

Figure 6:
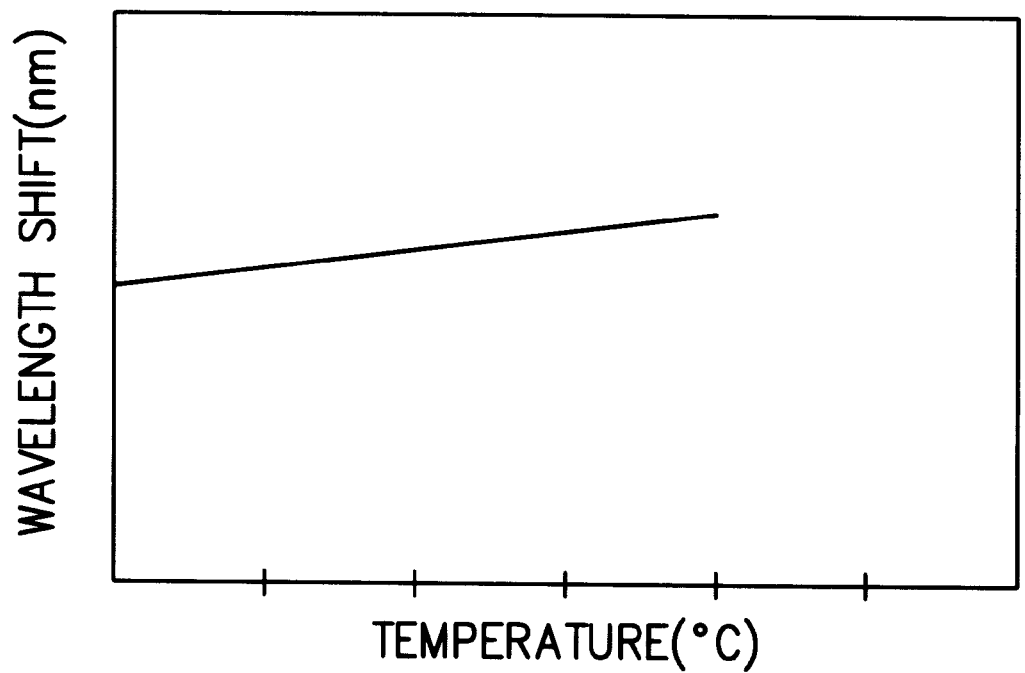
FIG. 6 is a graph showing the coupling wavelength shift with respect to the temperature increase by the effect of the recoating material with negative dn/dt.

FIG. 6 depicts a graph illustrating the coupling wavelength shift of a recoating material with respect to the temperature change. It is noted from the drawing that the coupling wavelength shifts to a long wavelength as the refractive index of the recoating material decreases with temperature increase. The shift of the coupling wavelength to a long wavelength implies that it exhibits a positive wavelength shift range.

Figure 7:
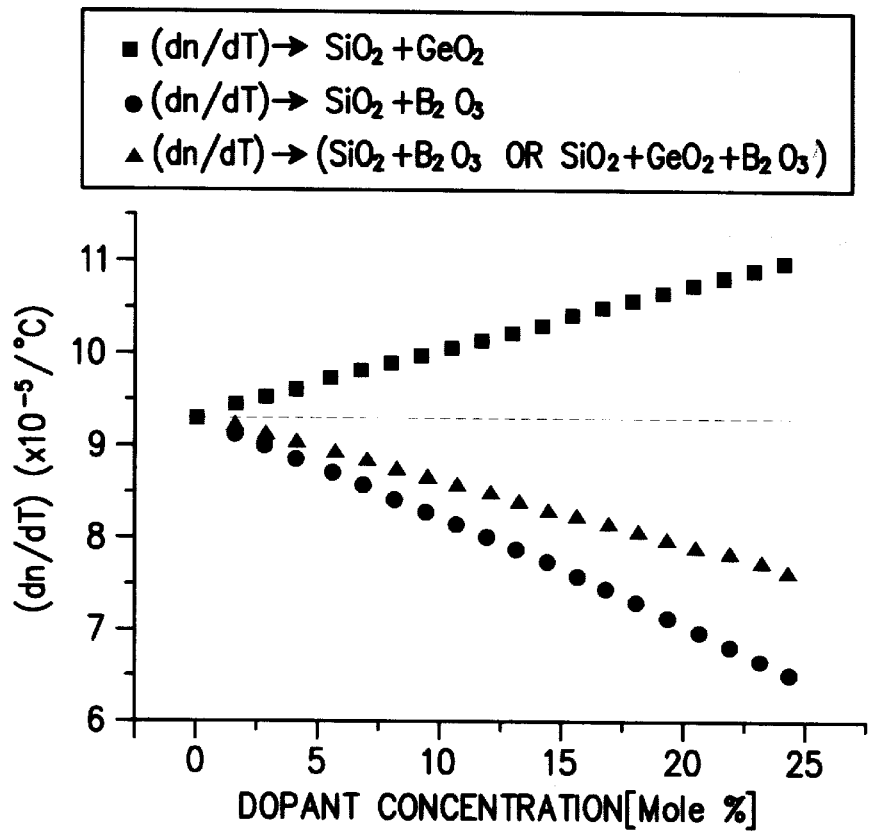
FIG. 7 is a graph showing the refractive index variation with temperature at different dopant concentrations incorporated into the optical fiber core.

FIG. 7 depicts a graph illustrating the coupling wavelength shift with respect to the temperature change at different concentrations of the amount of dopant added to an optical fiber core. The temperature compensation technique by adding $B_2O_3$ and $GeO_2$ as dopants to a core is disclosed in detail in EP 0 800 098 A2 entitled, "Optical Waveguide Grating and Production Method Thereof."

Figure 8:
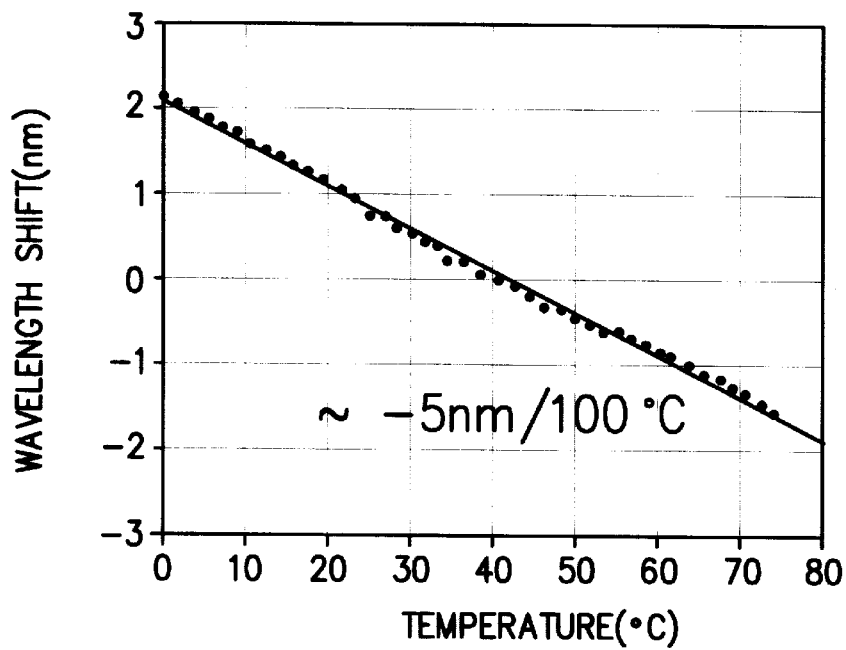
FIG. 8 is a graph showing the wavelength dependence on the temperature at a certain amount of $B_2O_3$ or $B_2O_3$ and $GeO_2$ doped in an optical fiber wire to exhibit a negative $d\Lambda/dt$ without recoating.

Long-period gratings written in a fiber with Ge doped core have positive $d(n_{co}-n_{cl}^{(m)})/dt$ because dn/dt of the germanium doped core is larger than $dn_{clad}/dt$, where the cladding is pure silica, as shown in FIG. 7. If we doped the appropriate amount of $B_2O_3$ or $B_2O_3$ and $GeO_2$, or any other dopants in the core to obtain so that the dn/dt of the doped core is smaller than dn/dt of the cladding, such as pure silica, the long-period fiber gratings exhibits a negative wavelength shift with temperature increase. That is, the refractive index difference with temperature, $d(n_{co}-n_{cl}^{(m)})/dt$, exhibits a negative value. For example, if 10 mol % of $GeO_2$ and 8 mol % of $B_2O_3$ are incorporated into the core, the change in the refractive index with temperature, $d(n_{co}-n_{cl}^{(m)})/dt$, exhibits a negative value, thus the coupling wavelength exhibits a negative wavelength shift range, as illustrated in FIG. 8. In the present invention, the temperature change is compensated by setting the wavelength shift range of the coupling wavelength to a negative value in the long-period fiber gratings and to a positive value in a recoating material so that they can balance each other.

FIG. 8 depicts a graph illustrating a shift of coupling wavelength into a short wavelength with temperature increase when the appropriate amount of $B_2O_3$ or $B_2O_3$+$GeO_2$, or any other dopants is doped in the core so that the $d(n_{co}-n_{cl}^{(m)})/dt$ is negative and when the long-period fiber gratings are not recoated. Since the coupling wavelength shifts into a short wavelength when temperature increases, this implies that the coupling wavelength in the long-period fiber grating filter device exhibits a negative wavelength shift range.

Figure 9:
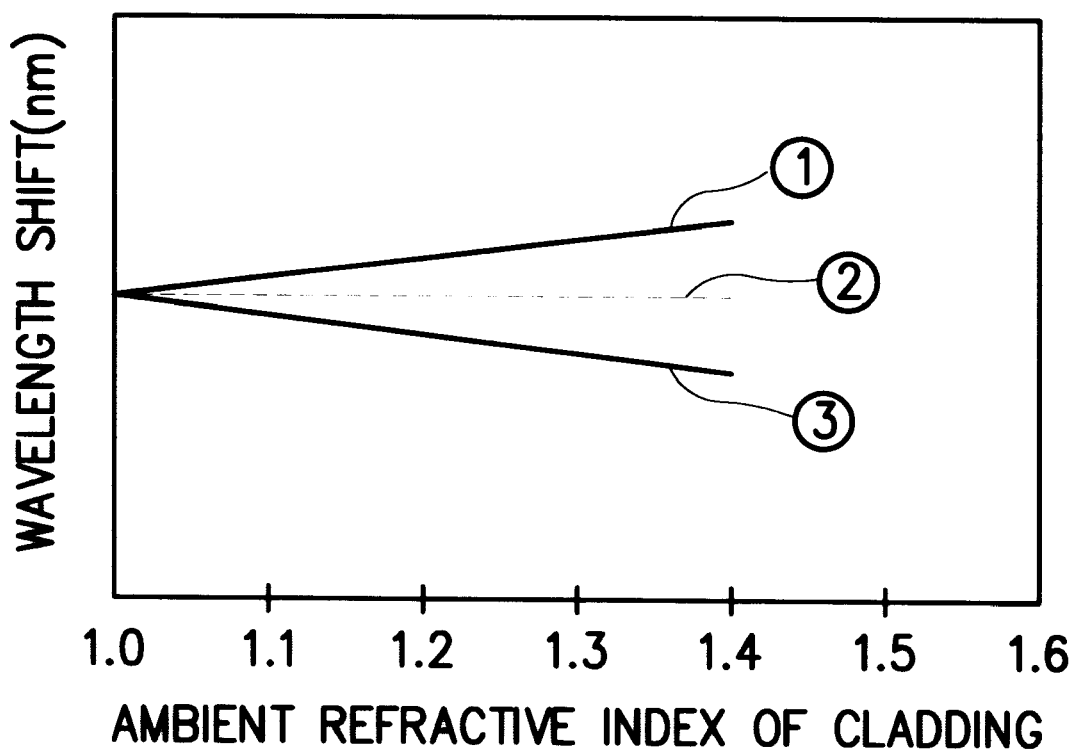
FIG. 9 is a graph showing the temperature compensation effect of a long-period fiber grating filter device according to the present invention.

FIG. 9 depicts a graph illustrating the long wavelength shift effect of a recoating material such as silicon resin with temperature increase in the long-period fiber grating filter device, and temperature compensation technique resulting from the short wavelength shift effect produced by the presence of concentration of $B_2O_3$ or any other dopants in the core in order to obtain smaller $dn_{co}/dt$ than $dn_{cl}/dt$. Reference numeral (1) indicates a shift of the coupling wavelength into a long wavelength due to the refractive index changing $dn_{cl}/dt$ of a polymer recoating material with temperature increase, and reference numeral (3) indicates a shift of the coupling wavelength into a short wavelength due to negative $d(n_{co}-n_{cl}^{(m)})/dt$ of long-period fiber grating. According to the present invention, when the long wavelength shift and the short wavelength shift of the coupling wavelength are concurrently produced in the long-period fiber grating filter device, they compensate each other to stabilize the wavelength, as indicated by reference numeral (2).

Figure 10A:
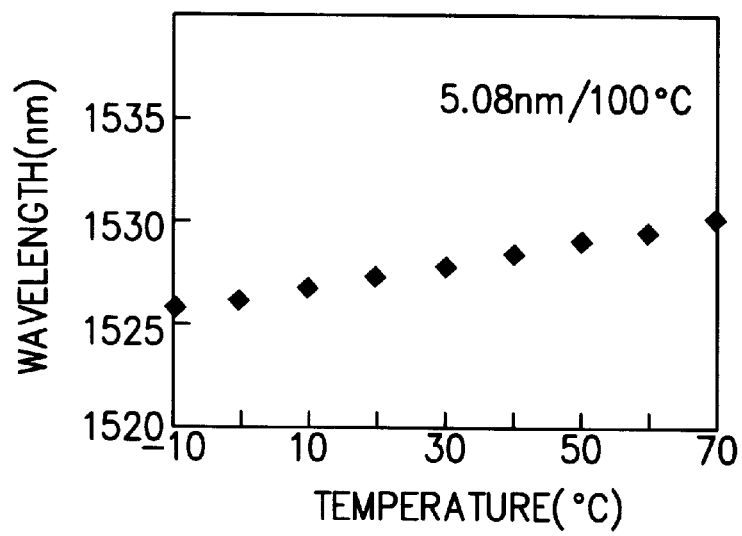
FIG. 10A is a graph showing the temperature dependence of a general long-period optical fiber grating device without the recoating.
Figure 10B:
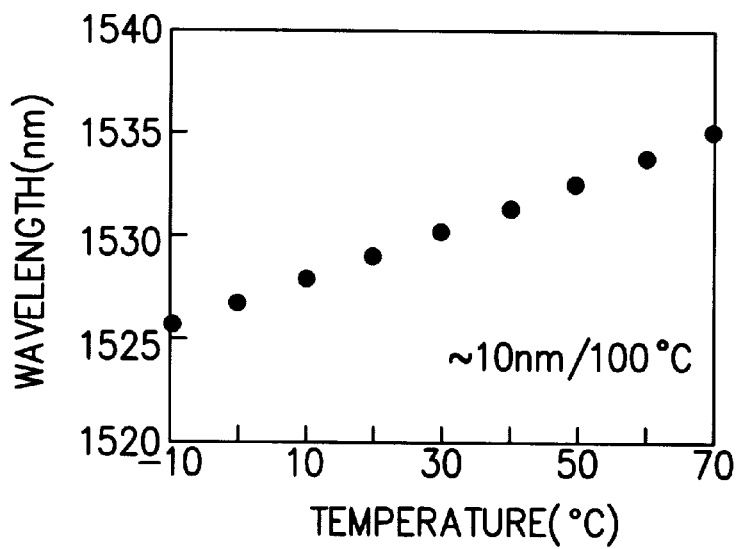
FIG. 10B is a graph showing the temperature dependence of a general long-period fiber grating filter device with the recoating which shows negative dn/dt.

FIGS. 10A and 10B each depicts graphs illustrating the wavelength shifts with respect to temperature increase for the general long-period fiber grating filter device with no recoating and the temperature dependence of the long-period fiber grating filter device with silicon resin as recoating material, respectively. The positive dΛ/dt effect by the recoating material is added into the positive dΛ/dt effect by the positive $d(n_{co}-n_{cl}^{(m)})/dt$.

Figure 11:
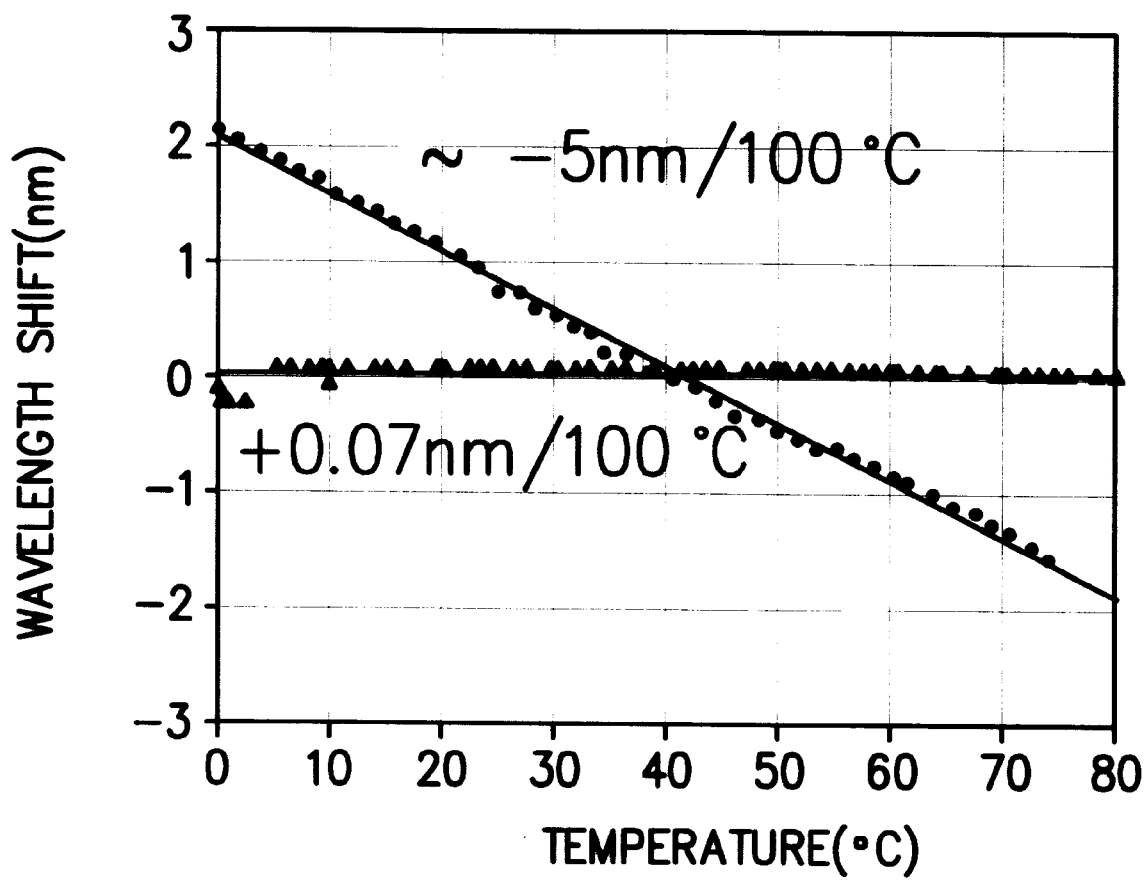
FIG. 11 is a graph showing temperature dependence of the long-period fiber grating filter device according to the present invention; and, FIG. 12 is a sectional view of the long-period fiber grating filter device according to the present invention.

FIG. 11 depicts a graph in accordance with the present invention illustrating the wavelength shift with temperature when the long-period grating filter device which exhibits a negative dΛ/dt is recoated with silicon resin. Total temperature sensitivity reduced to 0.07 nm/100° C. The advantage of the present invention as shown in FIG. 11 is appreciated better in view of FIG. 8. In FIG. 8 the wavelength shift with respect to a temperature change of the long-period grating filter device is shown with no recoating.

More specifically, the temperature compensation technique according to the present invention will be described hereinbelow in view of FIGS. 8, 9, 10A, and 10B.

As shown in FIG. 10A, when the general long-period grating filter device is not recoated, the coupling wavelength shifts into a long wavelength with temperature increase, and the temperature dependence of the wavelength is about 5.08 nm/100° C. In FIG. 10B, when the general long-period grating filter device is recoated with a general polymer with negative dn/dt, such as silicon resin, the coupling wavelength shifts into a long wavelength with temperature increase, and the temperature dependence of the wavelength is about 10 nm/100° C. It can be noted from FIGS. 10A and 10B that the long wavelength shift effect of silicon resin enhanced the long wavelength shift effect. That is, temperature dependence is further increased.

Referring to FIG. 8, when the optical fiber core includes the content of $B_2O_3$ in order exhibit $dn_{co}/dt$ that is less than $dn_{cl}/dt$, the long-period fiber grating filter device is not recoated, the coupling wavelength shifts into a short wavelength with temperature increase and the temperature dependence of the wavelength is about −5 nm/100° C. However, in FIG. 11, when the optical fiber exhibits smaller $dn_{co}/dt$ than $dn_{cl}/dt$ by selecting an appropriate dopant concentration and the long-period grating filter device is recoated with silicon resin in accordance with the present invention, the short wavelength effect of the long-period grating itself and the long wavelength shift effect of the recoating material are concurrently exhibited, balancing each other with temperature increase. As a result, the change in the coupling wavelength with respect to the temperature change is almost negligible. Here, the temperature dependence of the wavelength is about 0.07 nm/100° C.

Figure 12:
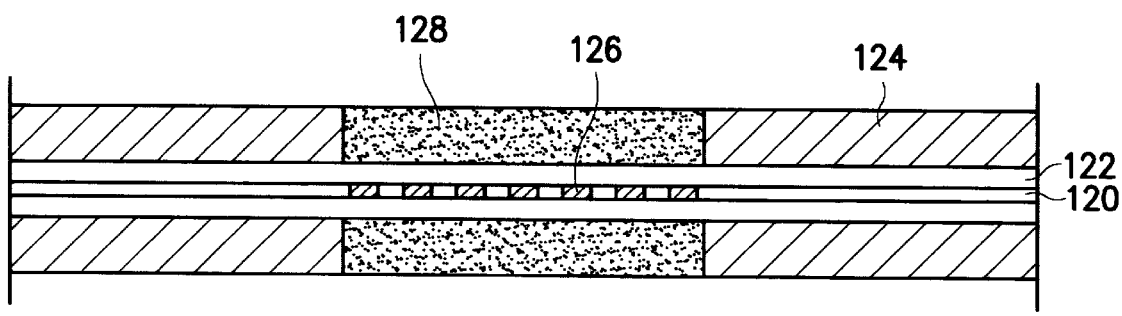

The design of the long-period fiber grating filter device of the present invention is illustrated in FIG. 12. The reference numeral 120 denotes a core having the content of $B_2O_3$ or $B_2O_3$+$GeO_2$, or any other dopants in order to show negative $d(n_{co}-n_{cl}^{(m)})/dt$, the reference numeral 122 denotes a cladding surrounding the core 120, and the reference numeral 126 denotes a plurality of long-period fiber gratings formed along the length of the core 120. The reference numeral 128 denotes a general polymer recoating material with negative dn/dt such as a silicon resin recoating which covers the long-period fiber gratings 126.

As described above, the long-period fiber grating filter device according to the present invention includes a core where the coupling wavelength shifts within a negative range at an increased temperature according to the amount of a dopant incorporated into the core, and a recoating material with negative dn/dt to form the coupling wavelength shifts within a positive range.

As it is apparent from the foregoing, the present invention has an advantage in that the coupling wavelength shift of the long-period fiber gratings attributed to a temperature change can be compensated, which permits the use of long-period grating device without temperature control.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A long-period grating filter device having long-period fiber gratings for permitting the use of said long-period fiber grating without temperature control, comprising:

an optical fiber including a core having a plurality of refractive index modulations spaced apart by a predetermined distance for transmission light of a given wavelength;

a cladding surrounding said core defining a boundary between said core and said cladding;

a recoating covering a portion of said cladding surrounding said refractive index modulations defining a cladding-recoating boundary;

a coating covering a portion of said cladding not surrounding said refractive index modulations;

wherein a response wavelength shift of said refractive index modulations exhibit a negative variation with temperature increase in relation to an amount of a dopant incorporated into said core; and wherein a response wavelength shift by an ambient refractive index of said cladding exhibits a positive variation with temperature increase, said wavelength variations by said recoating and said long-period fiber grating, which are opposite in sign, canceling each other.

2. The long-period grating filter device of claim 1, wherein said dopant comprises $B_2O_3$ or both $B_2O_3$ and $GeO_2$ or any other dopants producing said negative variation with temperature increase.

3. The long-period fiber grating filter device of claim 1, wherein said recoating comprises a polymer material that exhibits a decrease in refractive index with temperature increase.

4. The long-period grating filter device of claim 3, wherein said polymer material is silicon resin.

5. The long-period grating filter device of claim 1, wherein the refractive index of said recoating is less than the refractive index of said cladding.

* * * * *